United States Patent [19]
Akagiri et al.

[11] Patent Number: 5,737,717
[45] Date of Patent: Apr. 7, 1998

[54] METHOD AND APPARATUS FOR ALTERING FREQUENCY COMPONENTS OF A TRANSFORMED SIGNAL, AND A RECORDING MEDIUM THEREFOR

[75] Inventors: Kenzo Akagiri, Kanagawa; Makoto Akune, Tokyo, both of Japan

[73] Assignee: Sony Corporation, Japan

[21] Appl. No.: 351,386

[22] PCT Filed: Apr. 14, 1994

[86] PCT No.: PCT/JP94/00627

§ 371 Date: Feb. 21, 1995

§ 102(e) Date: Feb. 21, 1995

[87] PCT Pub. No.: WO94/24666

PCT Pub. Date: Oct. 27, 1994

[30] Foreign Application Priority Data

| Apr. 14, 1993 | [JP] | Japan | 5-087592 |
| Apr. 30, 1993 | [JP] | Japan | 5-127867 |
| May 25, 1993 | [JP] | Japan | 5-122918 |

[51] Int. Cl.⁶ ................................ G10L 3/02
[52] U.S. Cl. ................ 704/205; 704/204; 704/226; 704/227
[58] Field of Search .......... 395/2.13, 2.14, 395/2.35, 2.36

[56] References Cited

U.S. PATENT DOCUMENTS

| 5,115,240 | 5/1992 | Fujiwara et al. | 341/51 |
| 5,128,963 | 7/1992 | Akagiri | 375/25 |
| 5,150,387 | 9/1992 | Yoshikawa et al. | 375/122 |
| 5,151,941 | 9/1992 | Nishiguchi et al. | 395/2.42 |
| 5,157,760 | 10/1992 | Akagiri | 395/2 |
| 5,197,087 | 3/1993 | Iwahashi et al. | 375/122 |
| 5,204,677 | 4/1993 | Akagiri et al. | 341/118 |
| 5,241,603 | 8/1993 | Akagiri et al. | 381/37 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 341/50 |
| 5,311,561 | 5/1994 | Akagiri | 375/240 |
| 5,381,143 | 1/1995 | Shimoyoshi et al. | 341/51 |
| 5,388,209 | 2/1995 | Akagiri | 395/2.38 |
| 5,414,795 | 5/1995 | Tsutsui et al. | 395/2.13 |

(List continued on next page.)

FOREIGN PATENT DOCUMENTS

| 0421259 A2 | 4/1991 | European Pat. Off. | H04B 1/66 |
| 0446031 A3 | 9/1991 | European Pat. Off. | H04B 1/66 |
| 0458645 A2 | 11/1991 | European Pat. Off. | H04B 1/66 |
| 0466190 A2 | 1/1992 | European Pat. Off. | G11B 20/10 |
| 0473367 A1 | 3/1992 | European Pat. Off. | H03M 7/30 |
| 0506394 A2 | 9/1992 | European Pat. Off. | G10L 7/00 |
| 0525809 A2 | 2/1993 | European Pat. Off. | H04B 1/66 |
| 62-271000 | 11/1987 | Japan | G10L 7/04 |
| 63-117527 | 5/1988 | Japan | H04B 14/04 |

(List continued on next page.)

OTHER PUBLICATIONS

Patent Abstracts of Japan, vol. 13, No. 285 (E–780), JP 1069181, Published Mar. 15, 1989, Fujitsu Ltd.

M. Smith et al, "Exact Reconstruction Techniques For Tree–Structured Subband Coders," IEEE Transactions Of Acoustics, Speech & Signal Processing, vol. ASSP–34, No. 3, Jun. 1986, pp. 434–441.

(List continued on next page.)

*Primary Examiner*—Allen R. MacDonald
*Assistant Examiner*—Alphonso A. Collins
*Attorney, Agent, or Firm*—Limbach & Limbach LLP

[57] ABSTRACT

A signal transforming method and apparatus which improves the quality of a signal, and a recording medium therefore. This method and apparatus alters the frequency components of an acoustic time signal. By altering the frequency components the characteristics of the acoustic time signal is transformed such that its quality is improved. The alteration is such that the difference in magnitude of attributes of frequency components within a substantially critical band are adjusted based on characteristics of auditory sensing.

50 Claims, 8 Drawing Sheets

U.S. PATENT DOCUMENTS

| | | | |
|---|---|---|---|
| 5,438,643 | 8/1995 | Akagiri et al. | 395/2.1 |
| 5,454,011 | 9/1995 | Shimoyoshi | 375/240 |
| 5,461,378 | 10/1995 | Shimoyoshi et al. | 341/51 |
| 5,490,130 | 2/1996 | Akagiri | 369/124 |
| 5,491,481 | 2/1996 | Akagiri | 341/87 |
| 5,502,789 | 3/1996 | Akagiri | 395/2.13 |

FOREIGN PATENT DOCUMENTS

| | | | |
|---|---|---|---|
| 3-226109 | 10/1991 | Japan | H03H 17/02 |
| 4-072906 | 3/1992 | Japan | H03H 17/02 |
| 4-072908 | 3/1992 | Japan | H03H 17/02 |
| 4-72908 | 3/1992 | Japan | H03H 17/02 |
| WO 92/17884 | 10/1992 | WIPO | G11B 20/10 |

OTHER PUBLICATIONS

J. Rothweiler, "Polyphase Quadrature Filters –A New Subband Coding Technique," ICASSP Apr. 14–16, 1983, vol. 3, Of 3, pp. 1280–1283.

J. Princen et al, "Subband/Transform Coding Using Filter Bank Designs Based On Time Domain Aliasing Cancellation," ICASSP Apr. 6–9, 1987, IEEE vol. 4, pp. 2161–2164.

R. Crochiere, "Digital Coding Of Speech In Sub–Bands," The Bell System Technical Journal, vol. 55, No. 8, Oct. 1976, pp. 1069–1085.

METHOD AND APPARATUS FOR ALTERING FREQUENCY COMPONENTS OF A TRANSFORMED SIGNAL, AND A RECORDING MEDIUM THEREFOR

TECHNICAL FIELD

This invention relates to a signal transforming method and a signal transforming apparatus applied to, e.g., digital audio equipments and adapted for altering (changing) sound quality (i.e., transforming the characteristic of time signal information) by using particularly the property of the hearing sense with respect to an input audio signal which is a time signal, and a recording medium adapted so that information in which characteristic of time signal information is transformed by such method or apparatus is recorded thereonto or thereinto.

BACKGROUND ART

Hitherto, as a technique for altering (changing) sound quality of acoustic (audible) signal information, there are used, e.g., a system of altering the frequency characteristic by filtering processing, a system for producing higher harmonic (wave), a system of altering (changing) dynamic range by so called compressor, and the like.

However, in the case of the system using filter, how to use filter is changed e.g., a medium frequency band is enhanced to improve presence, etc., thus to change sound quality. In the system of producing higher harmonic (wave), use in a manner of sound effect is applied rather than sound easy to be heard is obtained. In addition, the system of changing (altering) dynamic range by compressor is a system such that big sound is not caused to be disagreeable to the ear, or soft sound is not caused to be masked by the ambient noise. With these systems, it is difficult to carry out optimum control such that sound agreeable to the ear is provided from a viewpoint of the hearing sense in a manner to cope with changes of acoustic signal information varying moment by moment.

In view of actual circumstances as described above, this invention has been proposed, and its object is to provide a signal transforming method and a signal transforming apparatus capable of transforming speech and acoustic signals significant with respect to sound quality from a viewpoint of the hearing sense of the human being, and a recording medium adapted so that speech or acoustic signal information of which characteristic is transformed by the above-mentioned method or apparatus is recorded thereonto or thereinto.

Namely, the task that this invention contemplates solving is to provide an technique for implementing a predetermined transform processing to acoustic signal information to create sound which can be heard agreeably with high quality from a viewpoint of sound quality for the human being moment by moment by using the auditive (auditory) principle (principle from a viewpoint of the hearing sense). Moreover, another task of this invention is to lessen, from acoustic signal information which has been already digitized so that quantizing (quantization) noises are added thereto, auditive influence of such quantizing noises to thereby improve quality. A further task of this invention is to lessen, from audio signal information which has been already digitized so that quantizing noise are added thereto, auditive influence of quantizing noises thereafter to create (prepare) data of which sound quality is improved by auditive processing when recorded on compact disc having word length of 16 bits by the technology for reducing noise level from a viewpoint of the hearing sense by altering (changing) spectrum of quantizing noise so as to become in conformity with so called equi-loudness characteristic or masking characteristic which has been already proposed as the technology for improving sound quality of audio equipment such as so called compact disc by the applicant of this invention (this technology will be referred to as, e.g., Super Bit Mapping technology hereinafter), i.e., the technologies disclosed in, e.g., Tokkaihei No. 2-20812 (Japanese Patent Application Laid Open No. 20812/1990), Tokkaihei No. 2-185552 (Japanese Patent Application Laid Open No. 185552/1990), and Tokkaihei No. 2-185556 (Japanese Patent Application Laid Open NO. 185556/1990). In accordance with the Super Bit Mapping technology, in the case of re-quantizing digital signal having word length beyond 16 bits for use in compact disc having 16 bit length, sound quality can be improved. A still further task of this invention is that with respect to audio signal information to which quantizing noises have been already added, in equivalently improving, from a viewpoint of hearing sense, sound quality so that its word length once becomes equal to 16 bits or more to re-quitize such audio signal information so that its word length becomes equal to 16 bits for a second time, word length is caused to be 16 bits while maintaining S/N of the frequency band important from a viewpoint of hearing sense in the state of 16 bits or more, thereby improving sound quality.

DISCLOSURE OF THE INVENTION

A signal transforming method and a signal transforming apparatus are characterized in that with respect to frequency components obtained from time signal information, difference in magnitude of attribute is altered (changed) between corresponding frequency component (any one of the frequency components) and at least one proximity frequency component. Here, acoustic time signal information is used as the time signal information wherein, with respect to frequency components obtained from the acoustic time signal information, difference in magnitude of attribute is altered (changed) between corresponding frequency component and any other frequency component or components within substantially critical band based on the hearing sense characteristic. The above-mentioned attribute is magnitude of frequency component.

Moreover, signal transforming method and signal transforming apparatus of this invention are characterized in that, with respect to frequency components obtained from acoustic time signal information, difference in magnitude of attribute is altered between corresponding frequency component and any frequency component or components above the minimum audible limit level or the masking threshold level of other frequency components within substantially critical band, difference in magnitude of attribute is altered between corresponding frequency component and any frequency component or components above level of a larger one of the minimum audible limit level and the masking threshold level of other frequency components within substantially critical band, or difference in magnitude of attribute is altered between corresponding frequency component and any frequency component or components within a limited level range of other frequency components within substantially critical band, thereby to transform the characteristic of the acoustic time signal information.

In addition, signal transforming method and signal transforming apparatus are characterized in that with respect to frequency component obtained from acoustic time signal information having frequency resolution and time resolution where at least two frequency components are different, difference in magnitude of attribute is altered between corresponding frequency component and any other frequency component or components within substantially critical band to thereby transform the characteristic of the acoustic time signal information.

Here, in transforming the acoustic time signal information into frequency components, an approach is employed to divide the acoustic time signal information into signals (signal components) in a plurality of bands thereafter to orthogonally transform signals in respective bands thus to obtain a plurality of frequency components. It should be noted that according as frequency shifts to lower frequency band side, frequency resolutions of the plural frequency components become higher.

Moreover, in altering (changing) the characteristic of the acoustic time signal information, an approach described below is employed. For example, with respect to at least one local peak of a plurality of frequency components obtained from acoustic time signal information, difference in magnitude of attribute is altered (changed) between corresponding frequency component and any other frequency component or components within substantially critical band. Further, difference in magnitude of attribute is caused to be large between corresponding frequency component and any other frequency component or components in the frequency region having a frequency difference which is 10% to 50% of substantially critical bandwidth. In addition, frequency region where difference in magnitude of attribute of frequency component is altered is determined by difference between two shift peak values of magnitude of attribute of frequency component having different number of frequency component samples. Frequency component in the frequency region where value obtained by subtracting shift peak value of 10% width of substantially critical bandwidth from shift peak value of 50% width of substantially critical band width is negative is caused to be smaller or to be null (deleted). Magnitude of frequency component is adjusted so as to retain short time energy of time signal information. Magnitude of frequency component of at least one local peak is adjusted so as to retain short time energy of time signal information. Difference in magnitude of attribute is altered (changed) between corresponding frequency component and any frequency component or components within level range limited by quantizing noise level.

Further, in accordance with the signal transforming method and the signal transforming apparatus of this invention, re-quantization processing having noise shape characteristic is implemented to time signal information re-synthesized on the time base. At this time, noise shape characteristic is dependent upon at least one of minimum audible limit, equi-loudness and masking characteristic.

In other words, the signal transforming method and apparatus of this invention implement filtering processing or orthogonal transform processing to input acoustic time signal to thereby obtain frequency components. Then, shift peak values every adjacent components of these frequency components are obtained at two different frequency widths relating to the critical band to allow the magnitude of frequency component in the frequency band where any difference between two kinds of shift peak values takes place to be smaller to thereby reduce the degree of dissonance between local peak frequency component and any other frequency component. In expanding input acoustic time signal on the frequency base, components on the time base in a plurality of frequency bands are obtained by filter, etc. thereafter to use blocking frequency analysis technique by orthogonal transform, etc., or to cascade-connect band division filters such as so called QMF (Quadrature Mirror Filter), CQF (Conjugate Quadrature Filter), etc. in a manner of tree structure to thereby carry out band division such that, in a range from lower frequency band to higher frequency band, frequency resolution gradually becomes lower, and time resolution is oppositely improved.

At this time, there may be employed a method of carrying out blocking by blocks such that time length in lower frequency band is greater than that in higher frequency band to carry out orthogonal transform processing or take peak values of a plurality of samples on the time base. Frequency bandwidth and time width of block are caused to have frequency resolution which sufficiently satisfies critical bandwidth so as to become optimum from a viewpoint of hearing sense. Whether or not spectrum obtained by analysis is more than masking threshold level (threshold level of masking) is judged by its magnitude and frequency. In the case where that spectrum is less than the masking threshold level, measure is taken such that attribute such as intensity or phase, etc. is not altered (changed). This similarly applies to the minimum audible limit. With respect to frequency components below the minimum audible limit, even if difference between shift peak values is not zero, measure is taken such that alteration is not made. Further, employment of a method of allowing acoustic signal information processed in a manner described above to undergo super bit mapping processing to thereby reduce bit length is effective for most effectively preventing degradation of sound quality when viewed from the hearing sense in the case where recording/reproduction/transmission, etc. are carried out by limited word length.

Further, in the case where level of quantizing noise which has been already added can be identified or expected, method of carrying out processing different from that of other components with respect to frequency component of this level is effective for effectively removing added quantizing noise. For example, employment of a method of giving attenuation greater than that of other components, or completely removing quantizing noise is effective. In addition, employment of method of allowing acoustic signal information processed in a manner described above to undergo the super bit mapping processing to thereby reduce bit length is effective for most effectively preventing degradation of sound quality from a viewpoint of hearing sense in the case of carrying out recording/reproduction/ transmission, etc. by limited word length.

Moreover, recording medium of this invention is adapted so that transformed data obtained after undergone processing by the above-mentioned signal transforming method or apparatus is recorded thereon or therein. As such recording medium, magneto-optical disc, optical disc, semiconductor memory, IC memory card, and the like can be enumerated.

Accordingly, in accordance with the signal transforming method and signal transforming apparatus of this invention, harmonious relationship between frequency components within critical band supported from a viewpoint of hearing sense is controlled, thereby making it possible to adjust sound quality of speech and acoustic signals so that it is advantageous to the human being. Moreover, employment of method of making no alteration with respect to frequency components less than masking threshold and minimum audible limit is effective in allowing unnecessary processing irrelevant from a viewpoint of sound quality to be carried out to the minimum degree, and preventing extra side effects such as connection distortion, etc. Further, employment of method in which although digital sample data recorded on compact disc has only resolution of word length of 16 bits, auditive alteration of frequency component and super bit mapping processing are combined to prepare 16 bit acoustic signal information to record it onto compact disc, etc. is effective in the case of recording acoustic signal information to which quantizing noise has been already added and acoustic signal information including frequency components undesired from a viewpoint of hearing sense onto compact disc, digital audio tape, etc.

BEST MODE FOR CARRYING OUT THE INVENTION

An embodiment of this invention will now be described with reference to the attached drawings.

Figure 1:
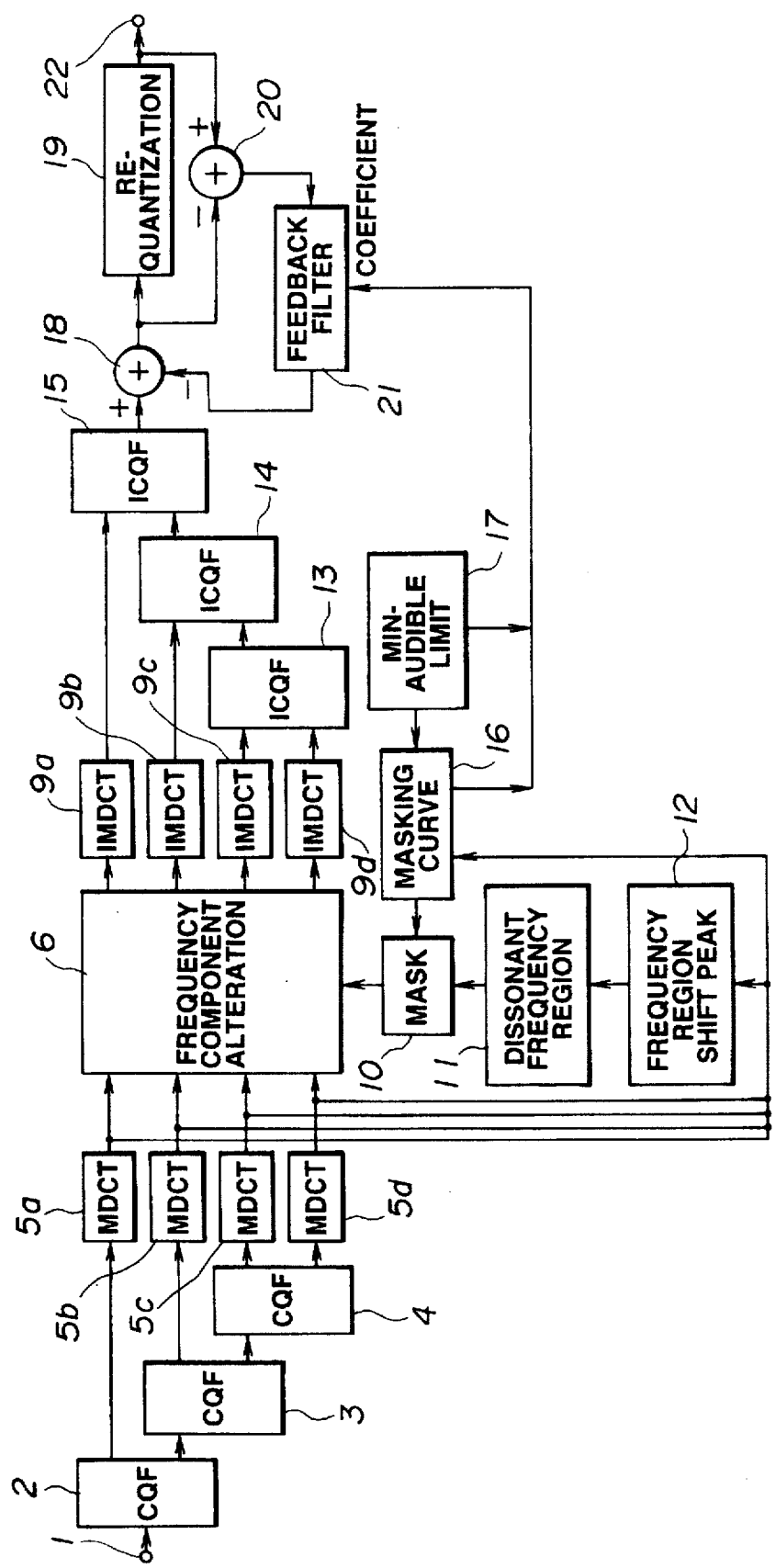
FIG. 1 is a circuit diagram showing, in a block form, an example of outline of the configuration of a signal transforming apparatus of this embodiment for realizing a method of transforming characteristic of time signal information (signal transforming method) of this invention.

A signal processing system of this embodiment to which a signal transforming method of this invention is applied comprises, as shown in FIG. 1, band division filters 2, 3, 4 and MDCT circuits 5a, 5b, 5c, 5d which will be described later as transforming means for transforming acoustic time signal information into signals (signal components) in a plurality of frequency components; and a frequency component altering (changing) circuit 6, a mask circuit 10, a frequency (region) shift peak detecting circuit 12, a dissonant frequency (region) detecting circuit 11, a masking threshold curve detecting circuit 16, and a minimum audible curve limit generating circuit 17 which will be described later as attribute altering (changing) means such that, with respect to at least one local peak of a plurality of frequency components obtained by the above-mentioned transforming means, it alters (changes) difference in magnitude of attribute between corresponding frequency component and any other frequency component or components within substantially critical band based on the hearing sense characteristic.

Moreover, attribute altering (changing) means of signal transforming apparatus of this embodiment to which signal transforming method of this invention is applied is operative so that, with respect to a plurality of frequency components obtained from the transforming means, it alters difference in magnitude of attribute between corresponding frequency component and any frequency component or components above minimum audible limit level or masking threshold level of other frequency components within substantially critical band, or that, with respect to frequency components obtained from acoustic time signal information having frequency resolution and time resolution where at least two frequency components are different of a plurality of frequency components obtained from the transforming means, it alters difference in magnitude of attribute between corresponding frequency component and any other frequency component or components within substantially critical band.

Initially, FIG. 1 is circuit diagram showing, in a block form, an example of outline of the configuration of signal processing system constituting a signal transforming apparatus of this embodiment which realize signal transforming method according to this invention as previously described above. Actual configuration of FIG. 1 will now be described.

Namely, the signal transforming apparatus of this embodiment divides an input digital signal such as speech (audio) or acoustic signal information (acoustic time signal information), etc. into signals (signal components) in a plurality of frequency bands, and makes a selection such that bandwidths of adjacent two bands of the lowest frequency band are the same and that, in higher frequency bands, bandwidth becomes broader according as frequency shifts to higher frequency band side therewithin to carry out orthogonal transform processing every respective frequency bands to determine, from spectrum data on the frequency base obtained, information of shift peak curve in frequency region and masking curve in frequency region.

From information of the shift peak curve in frequency region, frequency component is altered (changed) from harmonious relationship frequency components to thereby obtain frequency band which can expect preferable change of sound quality. Moreover, from information of masking curve in frequency region, frequency component which has been obtained from information of shift peak curve in the frequency region is altered to thereby determine frequency region or regions in which change of sound quality cannot be substantially expected by masking of frequency bands in which preferable change of sound quality can be expected, thus to exclude such region(s) from frequency band caused to be subject to alteration (change) of frequency component. Also with respect to frequency components below the minimum audible limit, they are excluded from frequency components subject to alteration. The magnitude of each frequency component within frequency band where the frequency component is altered (changed) determined in this way is caused to be smaller or to be null (removed).

Then, frequency components are caused to undergo inverse orthogonal transform processing to obtain time signal information to combine all bands by using synthesis filter to thereby obtained entire band time signal information. Further, in quantization, super bit mapping processing to optimize, from a viewpoint of hearing sense, quantizing noise spectrum within frequency band less than 20 Khz is carried out.

Explanation will be given in more detail with reference to FIG. 1. Input terminal 1 is supplied with audio PCM signal of 0~22 Khz when sampling frequency is, e.g., 44.1 Khz. This input signal is divided into signal in 0~11 Khz band and signal in 11 k~22 Khz band by using band division filter 2 such as CQF mentioned above, etc. The signal in the 0~11 Khz band is similarly divided into signal in 0~5.5 Khz band and signal in 5.5 k~11 Khz band by using band division filter 3 such as CQF filter, etc. Further, the signal in 0~5.5 Khz band is similarly divided into signal in 0~2.75 Khz band and signal in 2.75~5.5 Khz band by using band division filter 4.

The signal in 11 k~22 Khz from band division filter 2 is sent to MDCT (Modified Discrete Cosine Transform) circuit 5a which is one example of orthogonal transform circuit, the signal in 5.5 k~11 Khz band from band division filter 3 is sent to MDCT circuit 5b, the signal in 2.75 Khz~5.5 Khz band from band division filter 4 is sent to MDCT circuit 5c, and the signal in 0 Khz~2.75 Khz band from band division filter 4 is sent MDCT circuit 5d. Thus, these signals are respectively caused to undergo MDCT processing. As a matter of course, orthogonal transform such as Fast Fourier Transform CFFT) or Discrete Cosine Transform (DCT), etc. may be applied to these orthogonal transform circuits in addition to the above-mentioned MDCT.

Here, as a technique for dividing an input digital signal into signals (signal components) in a plurality of frequency bands by band division filter as described above, there is, e.g., technique using filter such as the CQF, etc. This is described in Mark J. T. Smith and Thomas P. Barnwell, "Exact Reconstruction Techniques for Tree-Structured Subband Coders," IEEE Trans. ASSP, Vol. ASSP-34 No. 3, June 1986, pp. 434–441. Moreover, in 1976 R. E. Crochiere Digital coding of speech in subbands Bell Syst. Tech. J. Vol. 55, No. 8 1976, technique using filter such as QMF, etc. is described. Further, in ICASSP 83, BOSTON Polyphase Quadrature Filters-A new subband coding technique Joseph H. Rothweiler, technique for filter division of equal bandwidth is described.

In addition, as the above-described orthogonal transform, there is, e.g., such an orthogonal transform to divide input audio signal into blocks every predetermined unit time (frame) to carry out, every respective blocks, e.g., Fast Fourier Transform (FFT), Discrete Cosine Transform (DCT), or Modified DCT, etc. to transform signals on the time base into signals on the frequency base. The above-mentioned MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

Figure 2:
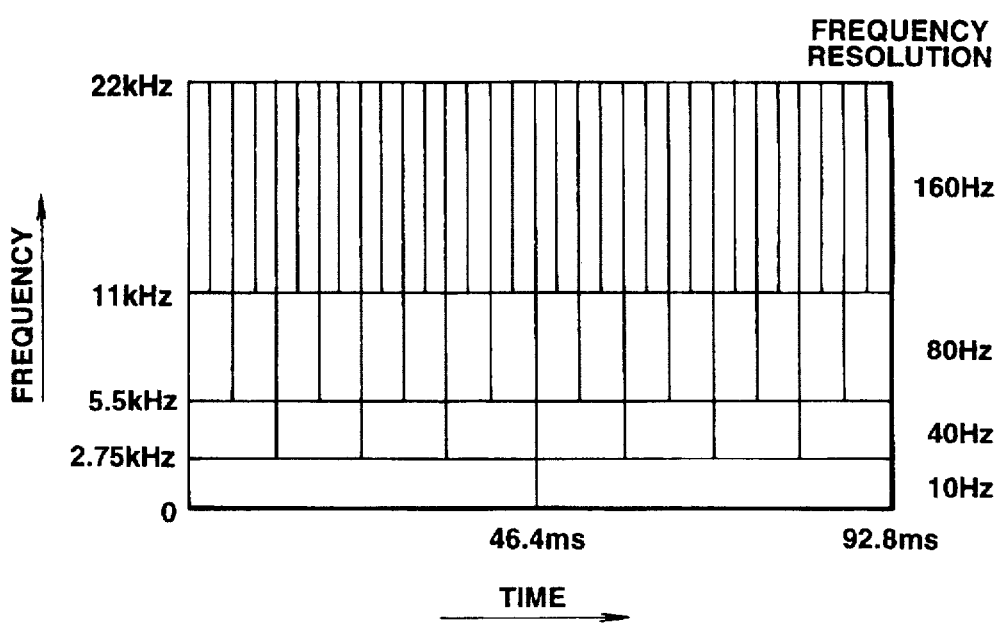
FIG. 2 is a view showing time blocks every respective frequency bands according to this invention.

Here, an actual example of a standard input signal with respect to blocks every respective frequency bands supplied to the above-mentioned respective MDCT circuits 5a, 5b, 5c, 5d is shown in FIG. 2.

In the actual example of FIG. 2, the above-described four filter output signals have orthogonal transform block sizes different every respective bands, and such a frequency analysis to sufficiently satisfy critical bandwidth at respective frequencies is carried out. Thus, according as frequency becomes higher, frequency resolution is lowered, but time resolution is instead improved. In this embodiment, frequency resolution is selected to such a degree that critical bands are substantially divided into ten bands, respectively. By this selection, it is possible to carry out control of the magnitudes of frequency components within critical band with frequency within critical band being considerably freely limited.

Namely, in this embodiment, in the frequency band from 0 Hz up to 2.75 Khz, time block size of orthogonal transform processing is set to 46.4 msec so that frequency resolution of approximately 10Hz which is one tenth of 100 Hz of the narrowest critical bandwidth of this band can be provided. Similarly, in the 2.75 Khz to 5.5 Khz band, time block size of orthogonal transform processing of 11.6 msec is used so that frequency resolution of 40 Hz is provided. In the 5.5 Khz to 11 Khz band, time block size of orthogonal transform processing of 5.8 msec is used so that frequency resolution of 80 Hz is provided. In the 11 Khz to 22 Khz band, time block size of orthogonal transform processing of 2.9 msec is used so that frequency resolution of 160 Hz is provided. It should be noted that, because critical bandwidth at 11 Khz is approximately 3 kHz, employment of method in which orthogonal transform block size is further caused to be one half so that frequency resolution of 320 Hz is provided is effective in further improvement in time resolution. In Table 1, center frequencies and band widths of critical bands are shown.

TABLE 1A

| Band No. [Bark] | Center Frequency [Hz] | Bandwidth [Hz] |
|---|---|---|
| 1 | 50 | 80 |
| 2 | 150 | 100 |
| 3 | 250 | 100 |
| 4 | 350 | 100 |
| 5 | 450 | 110 |
| 6 | 570 | 120 |
| 7 | 700 | 140 |
| 8 | 840 | 150 |
| 9 | 1000 | 160 |
| 10 | 1170 | 190 |
| 11 | 1370 | 210 |
| 12 | 1600 | 240 |
| 13 | 1850 | 280 |

TABLE 1B

| Band No. [Bark] | Center Frequency [Hz] | Bandwidth [Hz] |
|---|---|---|
| 14 | 2150 | 320 |
| 15 | 2500 | 380 |
| 16 | 2900 | 450 |
| 17 | 3400 | 550 |
| 18 | 4000 | 700 |
| 19 | 4800 | 900 |
| 20 | 5800 | 1100 |
| 21 | 7000 | 1300 |
| 22 | 8500 | 1800 |
| 23 | 10500 | 2500 |
| 24 | 13500 | 3500 |
| 25 | | |

Turning back to FIG. 1, frequency components or MDCT coefficient data obtained after undergone MDCT processing at respective MDCT circuits 5a, 5b, 5c, 5d are delivered to frequency shift peak detecting circuit 12 and dissonant frequency detecting circuit 11 which serve to establish frequency region where frequency component having dissonant relationship with respect to local peak frequency components, and masking threshold curve detecting circuit 16 for determining masking threshold curve.

The operation of the frequency shift peak detecting circuit 12 will now be described.

Figure 3:
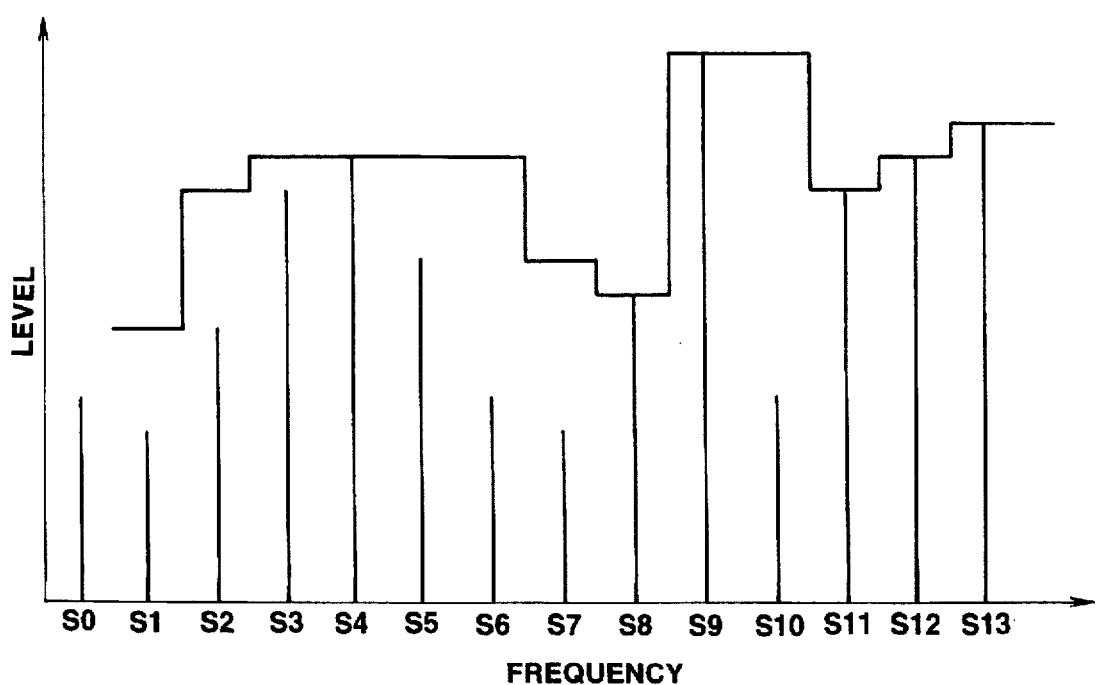
FIG. 3 is a view showing frequency shift peak according to this invention.

In FIG. 3, for easiness of understanding, method of taking shift peak values relating to three adjacent frequency components is explained.

Initially, with respect to shift peak value having component s1 as center, shift peak value is defined by magnitude of component having maximum magnitude of respective components s0, s1, s2 including the component s1 and both components adjacent thereto. With respect to shift peak value having component s1 as center, shift peak value is defined by magnitude of component having maximum magnitude of respective components s1, s2, s3 including the component s2 and both components adjacent thereto. By determining peak values in succession in this way, shift peak value curve is obtained.

Figure 4:
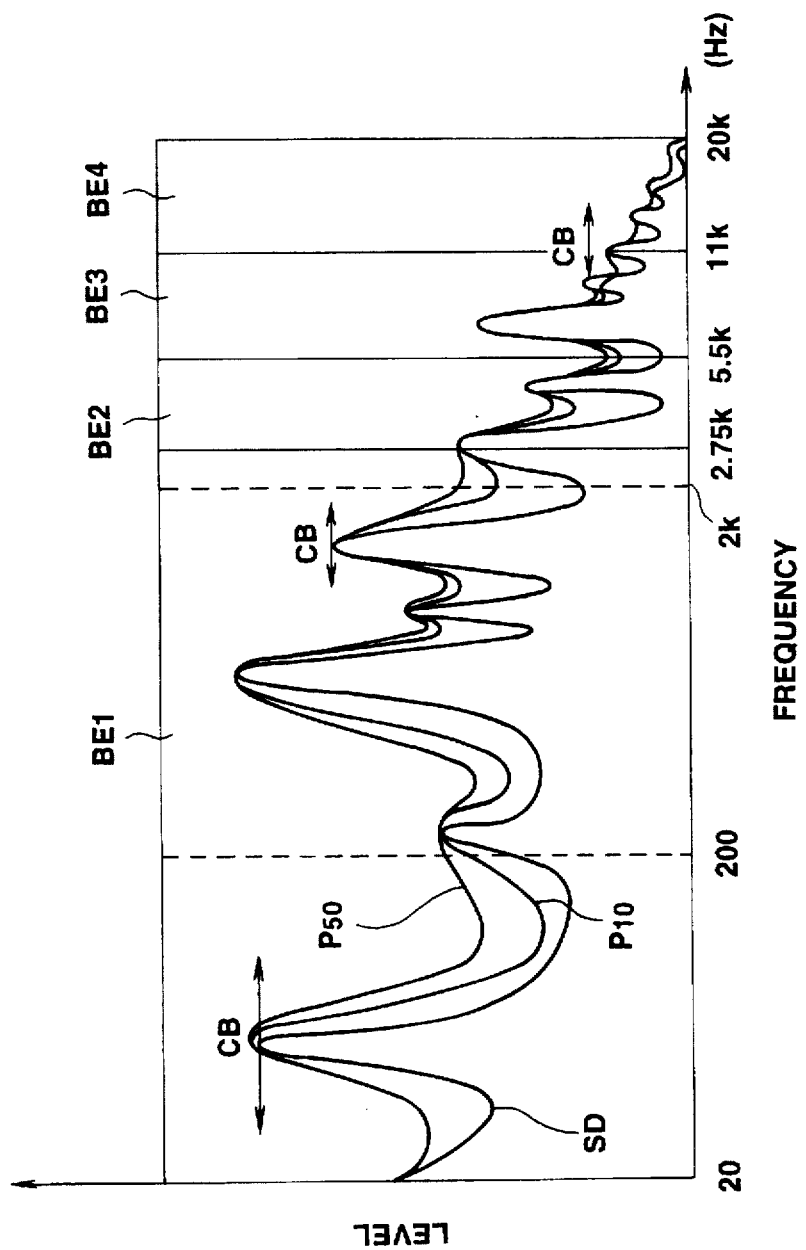
FIG. 4 is a view showing an example of frequency characteristic of frequency shift peak according to this invention.

Illustration is made for easiness of understanding in FIG. 3 such that frequency components all have the same bandwidth and frequency widths at the time of determining shift peak are equal. However, in this embodiment, as shown in FIG. 4, according as frequency shifts to higher frequency band side, frequency bandwidth that frequency component has becomes broader and shift peak value at frequency bandwidth which is 10% or 50% of critical bandwidth at that frequency is determined. In FIG. 4, BE1~BE4 respectively represent frequency bands, curve $P_{10}$ represents shift peak curve of 10% of critical bandwidth, curve $P_{50}$ represents shift peak curve of 50% width of critical bandwidth, curve SD represents frequency component distribution, and CB represents critical bandwidths at respective frequencies. In this case, in frequency band where peak values are defined in overlapping manner, a larger one of peak values is selected.

Figure 5:
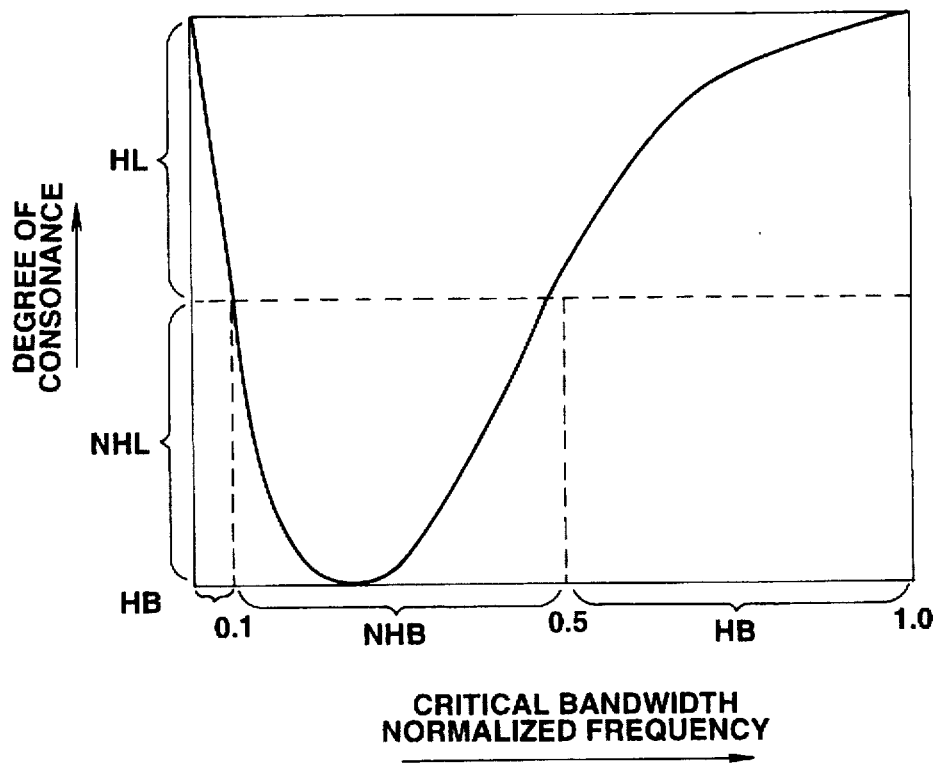
FIG. 5 is a view showing the relationship between the degree of consonance and critical band.

It should be noted that the above-mentioned critical bandwidth is physical quantity which can be satisfactorily understand the hearing sense characteristic of the human being such as consonance, sense of magnitude of noise, masking characteristic or the like, and consonance will now be described with respect to this invention with reference to FIG. 5. FIG. 5 represents that when frequency difference between two frequency components exists by frequency indicated on the abscissa (axis indicating frequency normalized by critical bandwidth), the degree of consonance or dissonance of these two frequency components is indicated on the ordinate. In accordance with this result, in a range where frequency difference between two frequency components is 10% to 50% of critical bandwidth (dissonant sound band NHB), sense of dissonance takes place (dissonant sound level NHL). In ranges of frequency difference from 0% to 10% and from 50% to 100% (consonant sound band HB), sense of consonance takes place (consonant sound level HL). It should be noted that this critical bandwidth is such that according as frequency shifts to higher frequency band side, bandwidth becomes broader.

Figure 6:
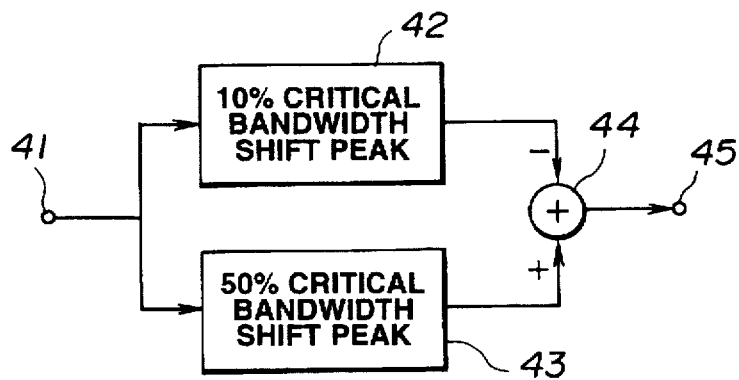
FIG. 6 is a circuit diagram showing, in a block form, an example of the configuration of dissonant band detecting circuit of the embodiment according to this invention.

Actual means for detecting dissonant band will now be described with reference to FIG. 6.

Figure 8:
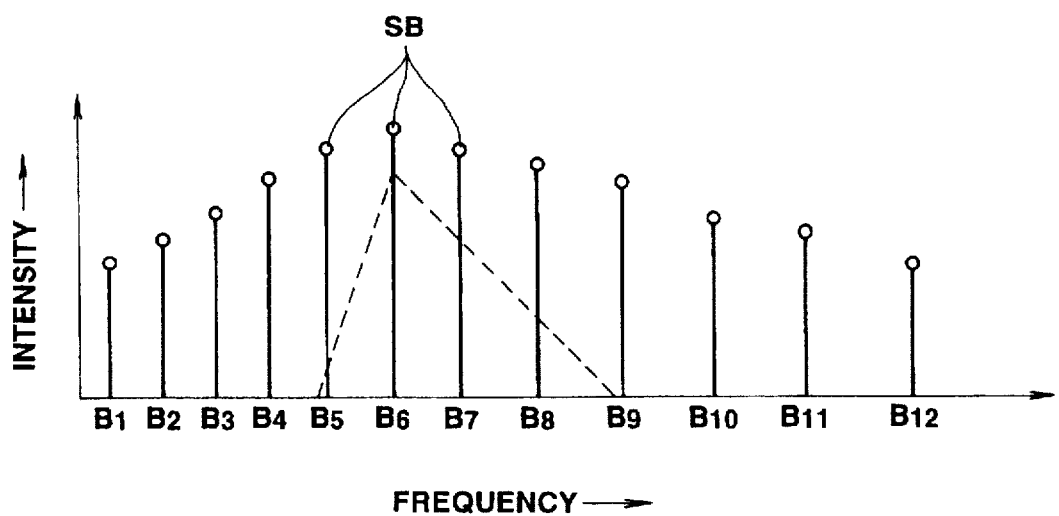
FIG. 8 is a view showing sum total value of signal components of respective critical bands.

Frequency components or MDCT coefficient data obtained after undergone MDCT processing at respective MDCT circuits 5a, 5b, 5c, 5d in FIG. 1 are caused to undergo processing for obtaining absolute values, and are then delivered to input terminal 41 of dissonant frequency detecting circuit 11 as dissonant band detecting means shown in FIG. 8. In this case, low frequency band side characteristic having longer time width is used commonly to respective higher frequency band times.

From frequency components delivered to input terminal 41, two shift peak characteristics having different frequency widths can be obtained. Namely, by shift peak detecting circuit 42 of 10% width of critical bandwidth which provides shift peak value of 10% width of critical bandwidth and shift peak detecting circuit 43 of 50% width of critical bandwidth which provides shift peak value of 50% width of critical bandwidth, two shift peak characteristics having different frequency widths can be obtained.

These shift peak curves obtained at shift peak detecting circuit 42 of 10% width of critical bandwidth which provides shift peak value of 10% width of critical bandwidth and shift peak detecting circuit 43 of 50% width of critical bandwidth which provides shift peak value of 50% width of critical bandwidth are caused to undergo processing for calculating difference therebetween by difference detecting circuit 44. The difference thus obtained is taken out from output terminal 45.

Frequency region where difference between shift peak values obtained in this way is above certain threshold level is defined as dissonant frequency region.

However, when other hearing sense effects, i.e., masking effect, equi-loudness, minimum audible limit are taken into consideration, there is no necessity of allowing all frequency components included in the dissonant frequency region determined in a manner described above to be subject to operation. Namely, when masking effect, equi-loudness, minimum audible limit are taken into consideration, even if frequency components judged not to be heard from a viewpoint of hearing sense are excluded from frequency component subject to operation, there is hardly influence. In addition, when equi-loudness is taken into consideration, method of allowing only frequency bands which are effective to be subject to operation is useful for reduction of operation quantity.

Mask circuit 10 having mask function, masking threshold curve detecting circuit 16 having masking curve calculating function and minimum audible curve generating circuit 17 for storing minimum audible limit information in FIG. 1 are used in order to exclude, from frequency component subject to operation, frequency components judged not to be heard from a viewpoint of hearing sense when masking effect and minimum audible limit are taken into consideration as explained above.

Mask function at the mask circuit 10, masking curve calculating function at masking threshold curve detecting circuit 16, and minimum audible limit memory function at minimum audible curve generating circuit 17 will now be described in more detail.

Figure 7:
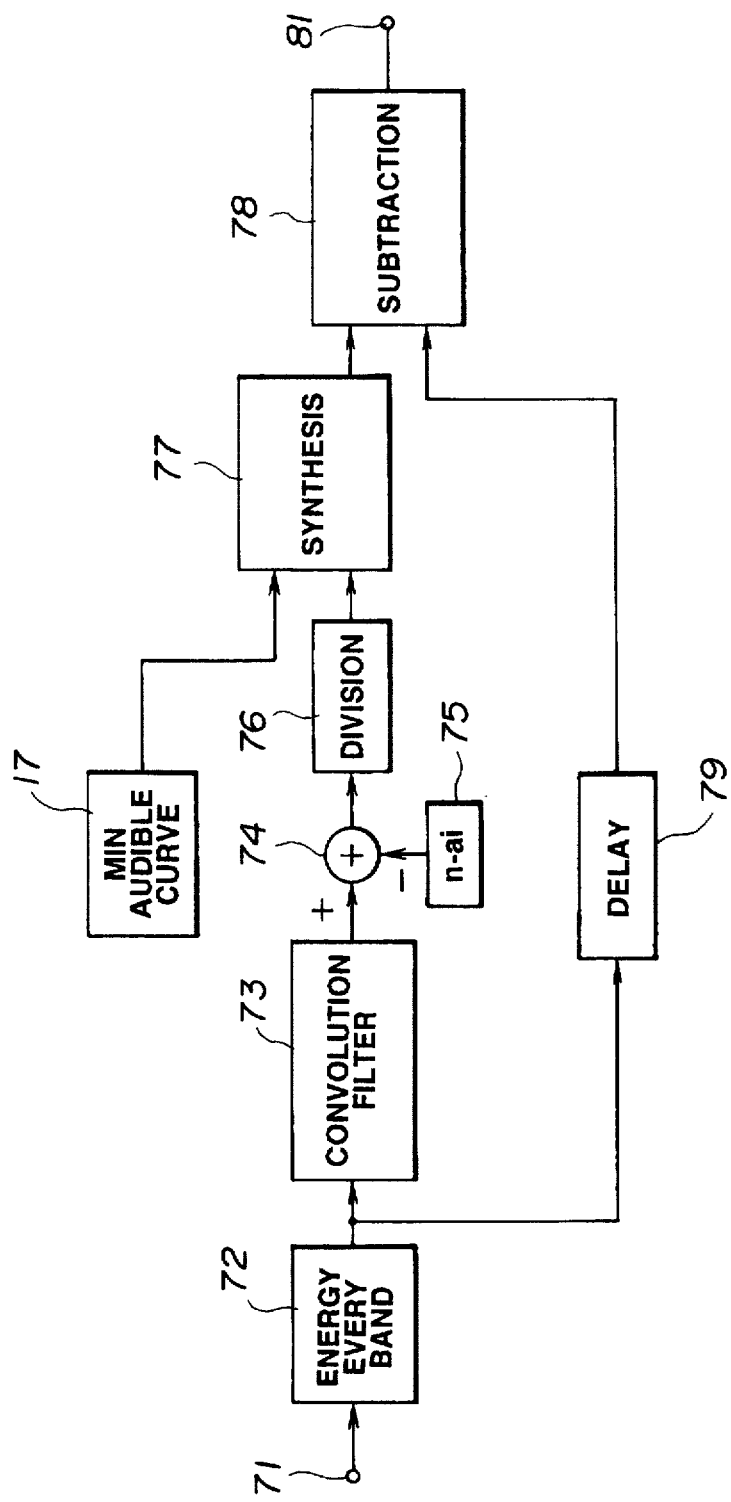
FIG. 7 is a circuit diagram showing, in a block form, an example of the configuration of masking threshold curve detecting circuit of the apparatus of the embodiment.

FIG. 7 is a circuit diagram showing, in a block form, outline of the configuration of an actual example of masking curve calculating function at the masking threshold curve detecting circuit 16.

In FIG. 7, input terminal 71 is supplied with frequency component data from respective MDCT circuits 5a, 5b, 5c, 5d in FIG. 1.

Input data on the frequency base is sent to circuit 72 for calculating energy every critical band, at which energies of respective critical bands are determined by calculating sum total of respective amplitude values of frequency components within respective critical bands. There are instances where peak value or mean value of amplitude value, etc. are used in place of energies every respective critical bands. As output from this energy calculating circuit 72, e.g., spectrum values of sum total value of respective bands are indicated as SB in FIG. 8. It should be noted that the number of division bands is represented by 12 bands (B1~B12) for brevity of illustration in FIG. 8.

In order to take into consideration influence in so called masking of the spectrum SB, such a convolution processing to multiply the spectrum values SB by a predetermined function to add them is implemented. To realize this, output of energy calculating circuit 72 every band, i.e., respective values of the spectrum SB are sent to convolution filter circuit 73. The convolution filter circuit 73 is composed of, e.g., a plurality of delay elements for sequentially delaying input data, a plurality of multipliers (e.g., 25 multipliers corresponding to respective bands) for multiplying outputs from these delay elements by filter coefficients (weighting function), and sum total adder for taking sum total of respective multiplier outputs. By this convolution processing, sum total of the portion indicated by dotted lines in FIG. 8 is taken with respect to, e.g., spectrum SB of band indicated by B6 in FIG. 8. It should be noted that the above-mentioned masking is the phenomenon that a signal is masked by another signal so that sound is not heard. For such masking effect, there are successive masking effect by audio signal on the time base and simultaneous masking effect by signal on the frequency base. By these masking effect, even if signal information or noises exist at the portion subject to masking, they would not be heard. For this reason, in the case of actual audio signal, there is no necessity of allowing signal information and noise within the range subject to masking to be frequency component subject to operation.

An actual example of multiplication coefficients (filter coefficients) of respective multipliers of the convolution filter circuit 73 will now be described. When coefficient of multiplier M corresponding to an arbitrary band is assumed to be 1, outputs of delay elements are respectively multiplied by coefficient 0.15 at multiplier M−1, coefficient 0.0019 at multiplier M−2, coefficient 0.0000086 at multiplier M−3, coefficient 0.4 at multiplier M+1, coefficient 0.06 at multiplier M+2, and coefficient 0.007 at multiplier M+3. Thus, convolution processing of the spectrum SB is carried out. In this case, M is arbitrary integers of 1~25.

Then, output of the convolution filter circuit 73 is sent to subtractor 74. This subtractor 74 serves to determine (calculate) level α corresponding to signal information or noise level which can be excluded from frequency component subject to operation that will be described later in the convoluted region. It is here noted that the level α corresponding to signal information or noise level which can be excluded from the frequency component subject to operation is such a level to become equal to signal information or noise level which can be excluded from frequency components subject to operation every respective bands of critical band (critical bandwidth) by carrying out inverse convolution processing. The subtractor 74 is supplied with allowed function (function representing masking level) for determining the level α. By increasing or decreasing this allowed function, control of the level α is carried out. This allowed function is delivered from (n−ai) function generating circuit 75 as described below.

Namely, when numbers given in order from low frequency band of bands of the critical band are assumed to be i, level α corresponding to signal information or noise level which can be excluded from frequency components subject to operation can be determined (calculated) by the following formula (1).

$$\alpha = S - (n - ai) \quad (1)$$

In the formula (1), n and a(>0) are constant, S is intensity of bark spectrum, and (n−ai) in the formula (1) is allowed function. In this embodiment, setting is made such that n=38 and a=1.

In this way, the above-mentioned α is determined. This data is sent to divider 76. This divider 76 serves to implement inverse convolution to the level α in the convoluted region. Accordingly, by carrying out this inverse convolution processing, masking spectrum can be obtained from the level α. Namely, this masking spectrum becomes signal information or noise spectrum which can be excluded from frequency component subject to operation.

It is to be noted while the inverse convolution processing requires complicated operation, simplified divider 76 is used in this embodiment to carry out inverse convolution.

Figure 9:
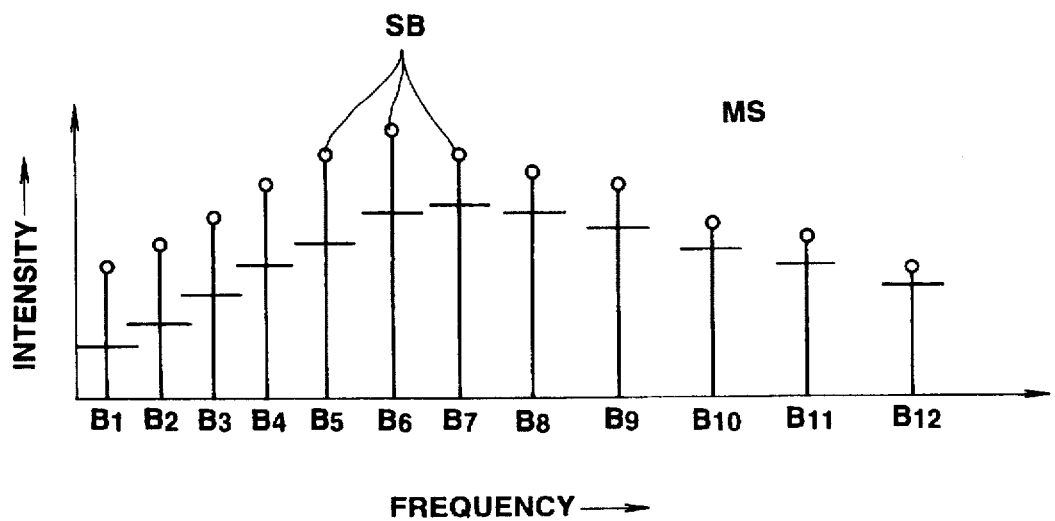
FIG. 9 is a view showing sum total value of signal components of respective critical bands and masking threshold.

The masking spectrum is sent to subtractor 78 through synthesis circuit 77. This subtractor 78 is supplied with output of energy detecting circuit 72 every critical band, i.e., the previously described spectrum SB through delay circuit 79. Accordingly, at this subtractor 78, subtractive operation between the masking spectrum and the spectrum SB is carried out. Thus, with respect to the spectrum SB, the portion below level indicated by level of the masking spectrum MS is masked as shown in FIG. 9.

Output from the subtractor 78 is taken out through a circuit (of which indication is omitted) for correcting signal information or noise level which can be excluded from frequency component subject to operation and through output terminal 81. The output thus taken out is sent to the mask circuit 10, at which frequency region which can be excluded from variable subject to operation of the dissonant frequency region is excluded.

Figure 10:
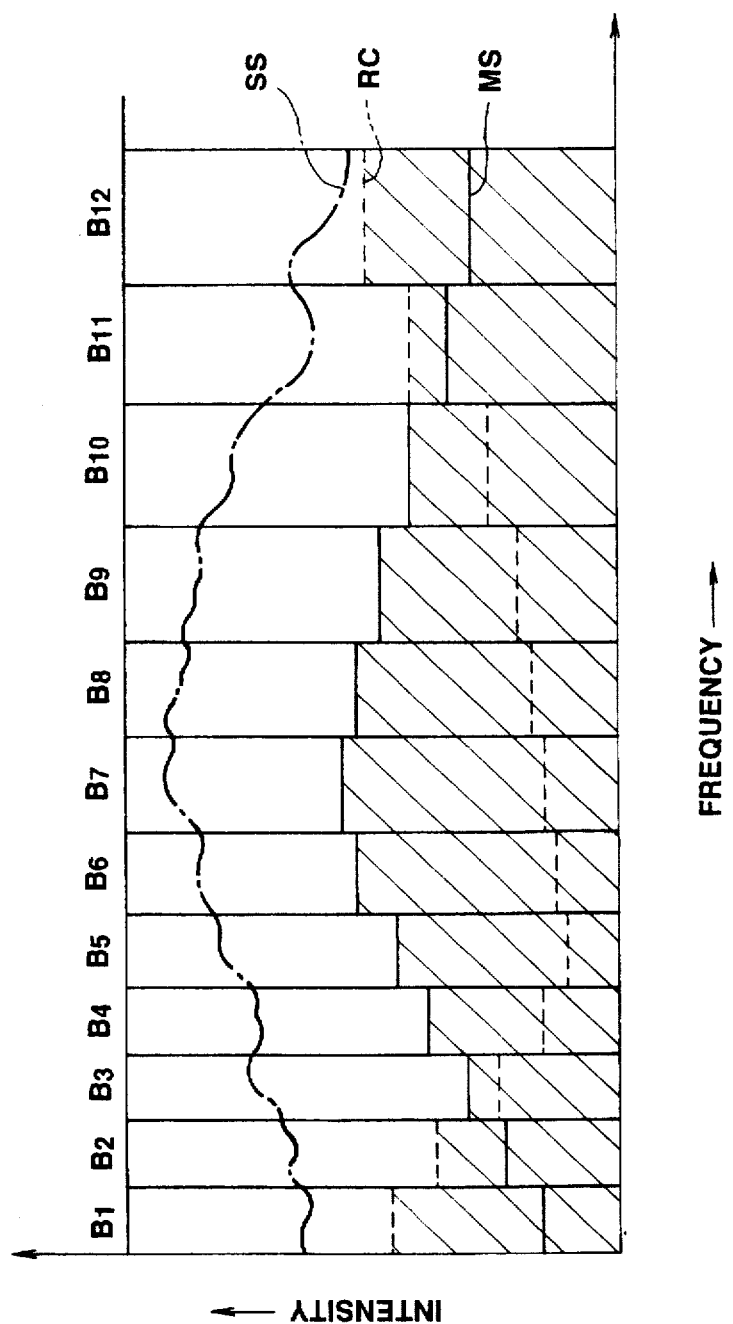
FIG. 10 is a view showing sum total value of signal components of respective critical bands, masking threshold, and minimum audible limit.

Delay circuit 79 is provided for delaying spectrum SB from energy detecting circuit 72 by taking into consideration delay quantities at respective circuits preceding to the synthesis circuit 77. Meanwhile, in synthesis at the above-described synthesis circuit 77, it is possible to synthesize data indicating so called minimum audible limit curve RC which is the hearing sense characteristic of the human being as shown in FIG. 10 delivered from minimum audible limit curve generating circuit 17 and the masking spectrum MS. In this minimum audible limit curve, if signal or absolute noise level is less than this minimum audible limit curve, signal and noise cannot be heard. This minimum audible limit curve changes, e.g., in dependency upon difference of reproduction volume at the time of reproduction. However, in realistic digital system, it is considered that since there is not so difference in way of entering of music into, e.g., 16 bit dynamic range, if quantizing noise in frequency band exceedingly easy to be heard to the ear cannot be heard, quantizing noise less than level of the minimum audible limit curve cannot be heard in other frequency bands. Accordingly, when, e.g., a way of use such that noise in the vicinity of 4 Khz of word length that system has is not heard is assumed to be adopted and the minimum audible limit curve RC and the masking spectrum MS are synthesized so that signal information or noise which can be excluded from frequency component subject to operation is provided, signal information or noise level which can be excluded from frequency component subject to operation can be as far as the portion indicated by slanting lines in FIG. 10.

In this embodiment, level of 4 Khz of the minimum audible limit curve is in correspondence with the minimum level corresponding to, e.g., 20 bits. In FIG. 10, signal spectrum is indicated together.

As another method of limiting frequency component subject to operation, there are instances where such frequency component is limited by level of quantizing noise included in input digital signal information. In the case where spectrum is substantially white, since quantizing noise level is substantially determined by word length, frequency component in this level range is caused to be limitedly frequency component subject to operation, thereby making it possible to effectively reduce or eliminate components which cause dissonance among quantizing noises. In FIG. 1, quantizing level storage function is caused to store quantizing noise level to thereby allow frequency component subject to operation to limitedly fall within the range of this level. As a matter of course, quantizing level may be adjusted to optimum value.

Moreover, the circuit for correcting signal information or noise level which can be excluded from frequency component subject to operation corrects signal information or noise level which can be excluded from frequency component subject to operation in output from the subtractor 78 on the basis of, e.g., information of equi-loudness curve sent from correction information output circuit of which indication is omitted. Here, equi-loudness curve is characteristic curve relating to the hearing sense characteristic of the human being. This equi-loudness curve is obtained by determining sound pressures of sound at respective frequencies which can be heard at the same pitch as pure sound of, e.g., 1 Khz, to connect them by curves, and is also called equi-sensitivity curve of loudness. Moreover, this equi-loudness curve depicts substantially the same curve as the minimum audible curve RC shown in FIG. 10. In this equi-loudness curve, e.g., in the vicinity of 4 Khz, even if sound pressure is lowered by 8~10 Db as compared to that at 1 Khz, sound can be heard at the same loudness (pitch) as that at 1 Khz. In contrast, in the vicinity of 10 Khz, if sound pressure is not higher than sound pressure at 1 Khz by about 15 Db, such sound cannot be heard as sound of the same loudness (pitch). For this reason, it is seen that magnitude of signal or noise above level of the minimum audible curve is evaluated by frequency characteristic given by curve corresponding to the equi-loudness curve. From facts described above, it is seen that employment of method of selecting signal information or noise which can be excluded from frequency component subject to operation for the purpose of reduction of quantity of operation by taking the equi-loudness curve into consideration is in conformity with the hearing sense characteristic of the human being.

Turning back to FIG. 1, the mask circuit 10 does not carry out alteration of frequency component in an unnecessary frequency band by using the above-described hearing sense effect. This mask circuit 10 outputs component information by which effective operation can be obtained in auditive improvement in sound quality of frequency components having dissonant relationship with respect to local peak component. Frequency component altering circuit 6 of FIG. 1 alters magnitude of frequency component subject to operation on the basis of this information.

Figure 11:
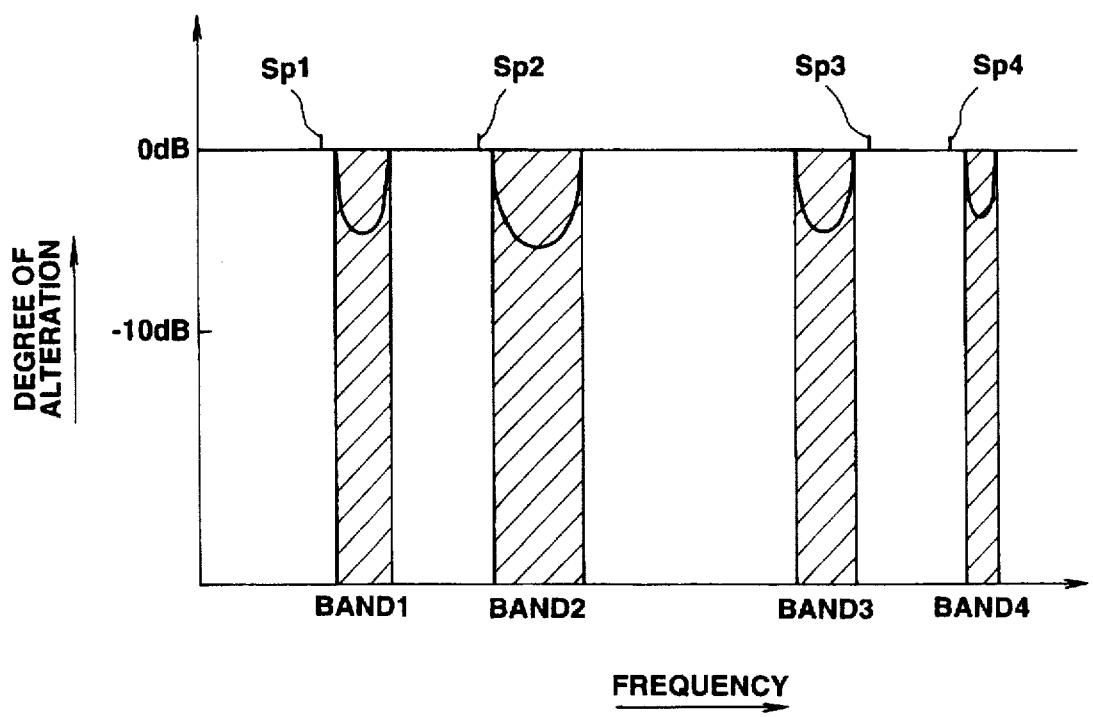
FIG. 11 is a view showing the example where the magnitude of frequency component is altered.

FIG. 11 shows the manner of altering magnitude of frequency component in the frequency component altering circuit 6.

In FIG. 11, Band 1~Band 4 are frequency regions where magnitude of frequency component designated by mask circuit 10 is altered. Degree of alteration is such that according as corresponding position shifts to the central portion of each band, it becomes greater. This utilizes the fact that degree of dissonance shown in the FIG. 5 mentioned above changes in dependency upon frequency difference. In the figure, SP1~SP4 represent gains at positions of respective local peak spectrum components. They indicate that magnitude of spectrum at corresponding frequency position is caused to be greater in order to compensation reduction of the entire energy resulting from the fact that frequency component in dissonant frequency band becomes small.

Output of frequency component altering circuit 6 which has altered magnitudes of frequency components in this way is caused to undergo processing such that signals (signal components) on the frequency base are transformed into signals (signal components) on the time base by IMDCT circuits 9a, 9b, 9c, 9d for carrying out inverse transform processing complementary to transform processing of the MDCT mentioned above. IMDCT output signals from these IMDCT circuits 9a, 9b, 9c, 9d are frequency-synthesized by band synthesis filters 13, 14, 15 having frequency synthesis (ICQF) function opposite to the above-mentioned CQF so that entire frequency band time signal is provided.

With respect to entire band signal by these band synthesis filters 13, 14, 15, since there are instances dynamic range is caused to be greater by change of frequency component as compared to the original input signal information, re-quantization into 16 bits may be required in the case of recording it onto compact disc. It is to be noted that the applicant of this invention has already disclosed such a technology to implement, to input digital audio signal, re-quantization to provide noise frequency characteristic close to equi-loudness characteristic by noise shaping in audio frequency band thus to record 16 bit re-quantized signal onto compact disc, e.g., in the previously described Tokkaihei No. 2-20812 (Japanese Patent Application Laid Open No. 20812/1990) publication, Tokkaihei No. 2-185552 (Japanese Patent Application Laid Open No. 185552/1990) publication, and Tokkaihei No. 2-185556 (Japanese Patent Application Laid Open No. 185556/1990). In accordance with this invention, in such a case, signal processed by this invention is further caused to undergo noise shaping, thereby making it possible to provide compact disc recording signal having characteristic above 16 bits.

The operation of noise shaper for carrying out the noise shaping will now be described with reference to FIG. 1. Signal delivered from the band synthesis filter 15 delivered to adding circuit 18 is caused to undergo processing to take difference between that signal and output signal of feedback filter 21. Output of adding circuit 18 is delivered to re-quantizer 19 and second adding circuit 20. The re-quantizer 19 serves to carry out transmission/recording of signal by lesser information quantity as the result of the fact that output is provided by word length lesser than input signal word length. Output of this re-quantizer 19 is delivered to output terminal 22 of this noise shape and second adding circuit 20. This second adding circuit 20 serves to obtain difference between input and output of re-quantizer 19. Thus, quantization error is extracted as output. Output of second adding circuit 20 is delivered to feedback filter 21.

The feedback filter will now be described in detail with reference to FIG. 12.

Figure 12:
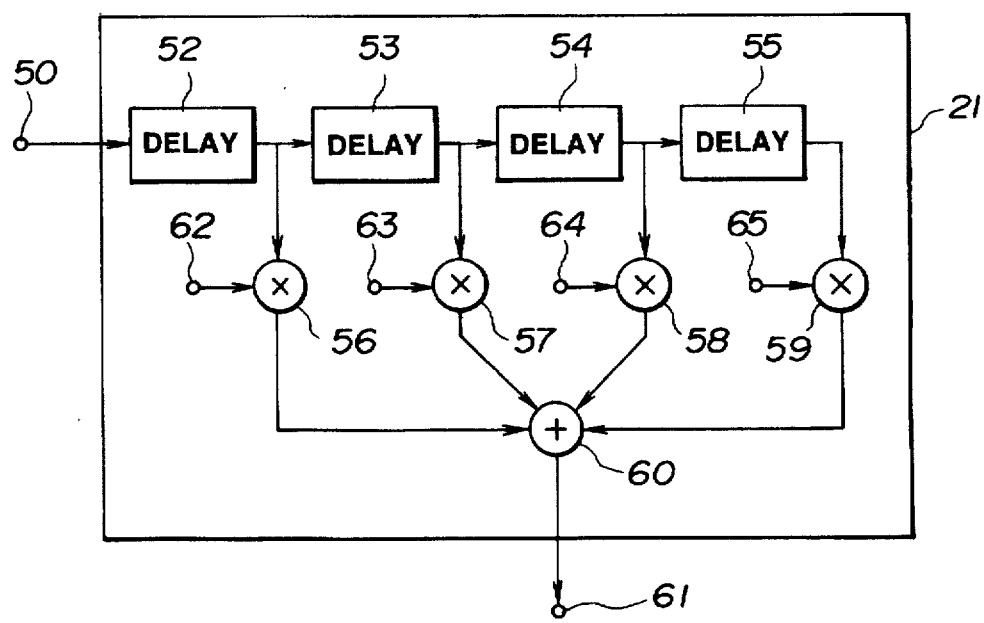
FIG. 12 is a view showing an example of the configuration of feedback filter for noise shaping.

In FIG. 12, signal delivered to feedback filter 21 through terminal 50 is sequentially shifted through a series circuit of delay elements 52, 53, 54, 55. Outputs of the delay elements 52, 53, 54, 55 are respectively to multiplying elements 56, 57, 58, 59. At these multiplying elements 56, 57, 58, 59, products of respective outputs of delay elements and filter coefficients delivered from corresponding coefficient input terminals 62, 63, 64, 65 are provided. Outputs of these multiplying elements 56, 57, 58, 59 are added at adding element 60. Added result is guided (delivered) to output terminal 61 of the feedback filter.

Digital audio signal to which noise frequency characteristic close to equi-loudness characteristics is given by noise shaper constituted by adding circuit 18, re-quantizer 19, second adding circuit 20 and feedback filter 21 mentioned above is outputted from output terminal 22. This output signal is caused to undergo predetermined error correction processing, etc. The error corrected signal thus obtained is recorded onto or into recording medium (magneto-optical disc, optical disc, semiconductor memory, IC memory card).

It should be noted that transformed data formed by the embodiment of this invention may be transmitted through transmission path in addition to recording onto or into recording medium.

In addition, this invention is not limited to the above-described embodiment, but may be applied to picture signal information, etc.

Industrial Applicability

In accordance with this invention, from facts as described above, predetermined transform processing is implemented to acoustic signal information, thus making it possible to create sound which is heard agreeable with high quality from a viewpoint of sound quality for the human being moment by moment by using the auditive principle. Moreover, approach is employed to lessen, from acoustic signal information which has been already digitized so that quantizing noises are added thereto, auditive influence of such quantizing noises, thus making it possible to improve quality. Further, approach is employed to lessen, from audio signal information which has been already digitized so that quantizing noises are added thereto, auditive influence of quantizing noise, whereupon technology for reducing noise level from a viewpoint of the hearing sense by altering spectrum of quantizing noise so as to become in conformity with so called equi-loudness characteristic or masking characteristic is used as technology for improving sound quality of audio equipment like compact disc, thus making it possible create data of which sound quality is improved by auditive processing at the time of recording onto compact disc having word length of 16 bits. Thus, in the case of re-quantizing digital signal having word length above 16 bits for use in compact disc having 16 bit length, sound quality can be improved. In addition, in accordance with this invention, in equivalently improving, from a viewpoint of hearing sense, sound quality of audio signal information to which quantizing noises have been already added so that its word length becomes equal to 16 bits or more to re-quantize such audio signal information so that its word length becomes equal to 16 bits for a second time, word length is caused to be 16 bits while maintaining S/N of the frequency band important from a viewpoint of hearing sense in the state of 16 bits or more, thereby making it possible to improve sound quality.

What is claimed is:

1. A signal transforming method in which, with respect to frequency components obtained from time signal information, difference in magnitude of attribute is altered between any one of the frequency components and at least one proximate frequency component, wherein an amount of alteration is determined by a subset of a total number of frequency components which exist in a critical band.

2. A signal transforming method as set forth in claim 1, wherein the time signal information is acoustic time signal information.

3. A signal transforming method in which, with respect to frequency components obtained from acoustic time signal information, difference in magnitude of attribute is altered between any one of the frequency components and any other frequency component or components within a substantially critical band based on the hearing sense characteristic, wherein an amount of alteration is such that after alteration the difference is approximately equal to zero.

4. A signal transforming method in which, with respect to at least one local peak of a plurality of frequency components obtained from acoustic time signal information, difference in magnitude of attribute is altered between the frequency component of the local peak and any other frequency component or components within a substantially critical band based on the hearing sense characteristic, wherein an amount of alteration is such that after alteration the difference is approximately equal to zero.

5. A signal transforming method in which, with respect to frequency components obtained from acoustic time signal information, difference in magnitude of attribute is altered between any one of the frequency components and any frequency component or components above minimum audible limit level or masking threshold level of other frequency components within a substantially critical band to thereby transform the characteristic of the acoustic time signal information, wherein an amount of alteration is such that after alteration the difference is approximately equal to zero.

6. A signal transforming method in which, with respect to frequency components obtained from acoustic time signal information, difference in magnitude of attribute is altered between any one of the frequency components and any frequency component or components above a larger one of minimum audible limit level and masking threshold level of other frequency components within a substantially critical band, wherein an amount of alteration is such that after alteration the difference is approximately equal to zero.

7. A signal transforming method in which, with respect to frequency components obtained from acoustic time signal information, difference in magnitude of attribute is altered between any one of the frequency components and any frequency component or components within a limited level range of other frequency components within a substantially critical band, thus to transform the characteristic of the acoustic time signal information, wherein an amount of alteration is such that after alteration the difference is approximately equal to zero.

8. A signal transforming method as set forth in claim 7, wherein difference in magnitude of attribute is altered between any one of the frequency components and any frequency component or components within a level range limited by quantizing noise level.

9. A signal transforming method in which, with respect to frequency components obtained from acoustic time signal information having frequency resolution and time resolution where at least two frequency components are different, difference in magnitude of attribute is altered between any one of the frequency components and any frequency component or components within a limited level range of other frequency components within a substantially critical band, wherein an amount of alteration is such that after alteration the difference is approximately equal to zero.

10. A signal transforming method as set forth in claim 9, wherein the acoustic time signal information is divided into signals in a plurality of frequency bands thereafter to orthogonally transform the signals in respective frequency band, thus to obtain a plurality of frequency components.

11. A signal transforming method as set forth in claim 10, wherein frequency resolutions of the plurality of frequency components become higher according as frequency shifts to lower frequency band side.

12. A signal transforming method as set forth in any one of claims 9, to 11, wherein, with respect to frequency components obtained from acoustic time signal information, difference in magnitude is altered between any one of the frequency components and any frequency component or components above minimum audible limit level or masking threshold level of other frequency components within a substantially critical band.

13. A signal transforming method as set forth in any one of claims 9 to 11, wherein, with respect to frequency components obtained from acoustic time signal information, difference in magnitude of attribute is altered between any one of the frequency components and any frequency component or components above a larger one of minimum audible limit level and masking threshold level of other frequency components within a substantially critical band.

14. A signal transforming method as set forth in any one of claims 9 to 11, wherein, with respect to frequency components obtained from acoustic time signal information, difference in magnitude of attribute is altered between any one of the frequency components and any frequency component or components within a limited level range of other frequency components within a substantially critical band.

15. A signal transforming method as set forth in any one of claims 5 to 11, wherein, with respect to at least one local peak of a plurality of frequency components obtained from the acoustic time signal information, difference in magnitude of attribute is altered between the frequency component of the local peak and any other frequency component or components within a substantially critical band.

16. A signal transforming method as set forth in any one of claims 3 to 11, wherein difference in magnitude of attribute is altered between any one of the frequency components and any other frequency component or components in a frequency region having a frequency difference of 10% to 50% of the substantially critical bandwidth.

17. A signal transforming method as set forth in any one of claims 3 to 11, wherein a frequency region where difference in magnitude of attribute of the frequency component is altered is determined by difference between two shift peak values obtained from the frequency components.

18. A signal transforming method as set forth in any one of claim 1 to 11, wherein magnitude of frequency component is adjusted so as to retain short time energy of the time signal information.

19. A signal transforming method as set forth in claim 18, wherein magnitude of frequency component of at least one local peak is adjusted so as to retain short time energy of the time signal information.

20. A signal transforming method as set forth in any one of claims 3 to 11, wherein a frequency component in a frequency region where a value obtained by subtracting a shift peak value of 10% width of the substantially critical bandwidth from a shift peak value of 50% width of the substantially critical bandwidth is negative is caused to be small or null (deleted).

21. A signal transforming method as set forth in any one of claims 5 to 11, wherein time signal information re-synthesized on the time base is caused to undergo re-quantization processing having noise shape characteristic.

22. A signal transforming method as set forth in claim 21, wherein the noise shape characteristic is dependent upon at least one of minimum audible limit, equi-loudness and masking characteristic.

23. A signal transforming method as set forth in any one of claims 1 to 11, wherein the attribute is magnitude of frequency component.

24. A signal transforming apparatus comprising:
transforming means for transforming time signal information into frequency components; and
attribute altering means for altering difference in magnitude of attribute between any one of the frequency components and at least one proximate frequency component, wherein an amount of alteration is determined by a subset of a total number of frequency components which exist in a critical band.

25. A signal transforming apparatus as set forth in claim 24, wherein the time signal information is acoustic time signal information.

26. A signal transforming apparatus comprising:
transforming means for transforming acoustic time signal information into frequency components; and
attribute altering means such that, with respect to the frequency component obtained from the transforming means, it alters difference in magnitude of attribute between any one of the frequency components and any other frequency component or components within a substantially critical band based on the hearing sense characteristic, wherein an amount of alteration is such that after alteration the difference is approximately equal to zero.

27. A signal transforming apparatus comprising:
transforming means for transforming acoustic time signal information into a plurality of frequency components; and
attribute altering means such that, with respect to at least one local peak of the plurality of frequency components obtained from the transforming means, it alters difference in magnitude of attribute between the frequency component of the local peak and any other frequency component or components within a substantially critical band based on the hearing sense characteristic, wherein an amount of alteration is such that after alteration the difference is approximately equal to zero.

28. A signal transforming apparatus comprising:
transforming means for transforming acoustic time signal information into frequency components; and
attribute altering means such that, with respect to the frequency component obtained from the transforming means, it alters difference in magnitude of attribute between any one of the frequency components and any frequency component or components above minimum audible limit level or masking threshold level of other frequency components within a substantially critical band, wherein an amount of alteration is such that after alteration the difference is approximately equal to zero,
thus to transform the characteristic of the acoustic time signal information.

29. A signal transforming apparatus comprising:
transforming means for transforming acoustic time signal information into frequency components; and
attribute altering means such that, with respect to the frequency components obtained from the transforming means, it alters difference in magnitude of attribute between any one of the frequency components and any frequency component or components above a larger one of minimum audible limit level and masking threshold level of other frequency components within a substantially critical band, wherein an amount of alteration is such that after alteration the difference is approximately equal to zero,
thus to transform the characteristic of the acoustic time signal information.

30. A signal transforming apparatus comprising:
transforming means for transforming acoustic time signal information into frequency components; and
attribute altering means such that, with respect to the frequency components obtained from the transforming means, it alters difference in magnitude of attribute between any one of thee frequency components and any frequency component or components within a limited range of other frequency components within a substantially critical band, wherein an amount of alteration is such that after alteration the difference is approximately equal to zero, thus to transform the characteristic of the acoustic time signal information.

31. A signal transforming means comprising:

transforming means for transforming acoustic time signal information into frequency components; and attribute altering means such that, with respect to frequency components obtained from acoustic time signal having frequency resolution and time resolution where at least two frequency components are different of the frequency components obtained from the transforming means, it alters difference in magnitude of attribute between any one of the frequency components and any other frequency component or components within a substantially critical band, wherein an amount of alteration is such that after alteration the difference is approximately equal to zero, thus to transform the characteristic of the acoustic time signal information.

32. A signal transforming apparatus as set forth in claim 31, wherein the transforming means divides the acoustic time signal information into signals in a plurality of frequency bands thereafter to orthogonally transform the signals in respective frequency bands, thus to obtain a plurality of frequency components.

33. A signal transforming apparatus as set forth in claim 32, wherein the transforming means is such that according as frequency shifts to lower frequency band side, frequency resolutions of the plurality of frequency components become higher.

34. A signal transforming apparatus as set forth in any one of claims 31 to 33, wherein the attribute altering means is operative so that, with respect to frequency components from acoustic time signal information, it alters difference in magnitude of attribute between any one of the frequency components and any frequency component or components above minimum audible limit level or masking threshold level of other frequency components within a substantially critical band.

35. A signal transforming apparatus comprising:

transforming means for transforming acoustic time signal information into frequency components; and attribute altering means such that, with respect to the frequency components from the acoustic time signal information by the transforming means, it alters difference in magnitude between any one of the frequency components and any frequency component or components above a larger level of minimum audible limit level and masking threshold level of other frequency components within a substantially critical band, wherein an amount of alteration is such that after alteration the difference is approximately equal to zero, thus to transform the characteristic of the acoustic time signal information.

36. A signal transforming apparatus as set forth in any one of claims 31 to 33 or 35, wherein the attribute altering means is operative so that, with respect to frequency components obtained from acoustic time signal information, it alters difference in magnitude of attribute between any one of the frequency components and any frequency component or components within a limited level range of other frequency components within a substantially critical band.

37. A signal transforming apparatus as set forth in claim 30 to 33 or 35, wherein the attribute altering means alters difference in magnitude of attribute between any one of the frequency components and any frequency component or components within a level range limited by quantizing noise level.

38. A signal transforming apparatus as set forth in any one of claims 28 to 33 or 35, wherein the attribute altering means is operative so that, with respect to at least one local peak of a plurality of frequency components obtained from acoustic time signal information, it alters difference in magnitude of attribute between any one of the frequency components and any other frequency component or components within a substantially critical band.

39. A signal transforming apparatus as set forth in any one of claims 26 to 33 or 35, wherein the attribute altering means allows difference in magnitude of attribute to be large between any one of the frequency components and any other frequency component or components in a frequency region having a frequency difference of 10% to 50% of the substantially critical bandwidth.

40. A signal transforming apparatus as set forth in any one of claims 26 to 33 or 35, wherein the attribute altering means determines a frequency region where difference in magnitude of attribute of frequency component is altered by a difference between two shift peak values of magnitude of attribute of frequency components having different frequency component sample numbers.

41. A signal transforming apparatus as set forth in any one of claims 24 to 33 or 35, wherein the attribute altering means adjusts magnitude of frequency component so as to retain short time energy of time signal information.

42. A signal transforming apparatus as set forth in claim 41, wherein the attribute altering means adjusts magnitude of a frequency component of at least one local peak so as to retain short time energy of time signal information.

43. A signal transforming apparatus as set forth in any one of claims 26 to 33 or 35, wherein, at the attribute altering means, a frequency component of a frequency region where a value obtained by subtracting shift peak value of 10% width of the substantially critical bandwidth from a shift peak of 50% width of the substantially critical band is negative is caused to be small or null (deleted).

44. A signal transforming apparatus as set forth in any one of claims 28 to 33 or 35, which comprises re-quantizing processing means for implementing re-quantization having noise shape characteristic to time signal information re-synthesized on the time base.

45. A signal transforming apparatus as set forth in claim 44, wherein the noise shape characteristic at the re-quantizing processing means is dependent upon at least one of minimum audible limit, equi-loudness and masking characteristic.

46. A signal transforming apparatus as set forth in any one of claims 24 to 33 or 35, wherein the attribute is magnitude of frequency component.

47. A signal transforming method comprising the steps of:

obtaining frequency components from a signal;

reducing the difference in magnitude of attribute between a local peak frequency component and a second frequency component;

wherein the local peak frequency component and the second frequency component are within a substantially critical band, wherein the difference is reduced by increasing the magnitude of attribute of the second frequency component, wherein the difference is made to be approximately equal to zero.

48. A signal transforming method as set forth in claim 47, wherein difference local peak frequency component and the second frequency component have a frequency difference of 10% to 50% of the substantially critical bandwidth.

49. A signal transforming method as set forth in claim 47, wherein the magnitude of attribute of the second frequency component is adjusted so as to retain short time energy of the time signal information.

50. A signal transforming method as set forth in claim 47, wherein a frequency component in a frequency region where a value obtained by subtracting a shift peak value of 10% width of the substantially critical bandwidth from a shift peak value of 50% width of the substantially critical bandwidth is negative is caused to be small or null (deleted).

* * * * *